United States Patent
Doerry

(10) Patent No.: US 7,551,119 B1
(45) Date of Patent: Jun. 23, 2009

(54) FLIGHT PATH-DRIVEN MITIGATION OF WAVEFRONT CURVATURE EFFECTS IN SAR IMAGES

(75) Inventor: Armin W. Doerry, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 11/970,631

(22) Filed: Jan. 8, 2008

(51) Int. Cl.
*G01S 13/90* (2006.01)

(52) U.S. Cl. .................. 342/25 R; 342/25 A; 342/25 F; 342/159; 342/194; 342/195

(58) Field of Classification Search ............... 342/25 R, 342/25 A–25 F, 159, 162, 194, 195
See application file for complete search history.

(56) References Cited

U.S. PATENT DOCUMENTS

| | | | | |
|---|---|---|---|---|
| 4,758,838 A | * | 7/1988 | Maeda et al. | 342/25 D |
| 5,179,383 A | * | 1/1993 | Raney et al. | 342/25 D |
| 5,208,685 A | * | 5/1993 | Aleksoff et al. | 359/19 |
| 6,027,447 A | * | 2/2000 | Li | 600/447 |
| 6,037,892 A | * | 3/2000 | Nikias et al. | 342/25 F |
| 6,400,306 B1 | * | 6/2002 | Nohara et al. | 342/25 R |
| 6,735,346 B2 | | 5/2004 | Woodford et al. | |
| 7,405,834 B1 | * | 7/2008 | Marron et al. | 356/521 |
| 2005/0128126 A1 | * | 6/2005 | Wolframm et al. | 342/25 R |

FOREIGN PATENT DOCUMENTS

| | | | |
|---|---|---|---|
| JP | 60020162 A | * | 2/1985 |
| JP | 61201180 A | * | 9/1986 |
| JP | 62073182 A | * | 4/1987 |

OTHER PUBLICATIONS

J. L. Walker, "Range-Doppler Imaging of Rotating Objects," IEEE Trans. on Aerospace and Electronic Systems, AES-16 (1), pp. 23-52, (1980).
N. E. Doren, C. V. Jakowatz, Jr., D. E. Wahl, P. A. Thompson, "General formulation for wavefront curvature correction in polar-formatted spotlight-mode SAR images using space-variant post-filtering", Proceedings of 1997 International Conference on Image Processing, vol. 1, pp. 861-864, Oct. 26-29, 1997.
C. V. Jakowatz, D. E. Wahl, P. A. Thompson, N. E. Doren, "Space-variant filtering for correction of wavefront curvature effects in spotlight-mode SAR imagery formed via polar formatting", Proceedings of the SPIE—The International Society for Optical Engineering, Algorithms for Synthetic Aperture Radar Imagery IV, vol. 3070, pp. 33-42, Orlando, FL, USA, Apr. 23-24, 1997.
N. E. Doren, "Space-Variant Post-Filtering for Wavefront Curvature Correction in Polar-Formatted Spotlight-Mode SAR Imagery", Sandia Report SAND99-2706, pp. 133-163, 200-203, Oct. 1999.

* cited by examiner

Primary Examiner—John B Sotomayor
(74) Attorney, Agent, or Firm—Scott B. Stahl

(57) ABSTRACT

A wavefront curvature effect associated with a complex image produced by a synthetic aperture radar (SAR) can be mitigated based on which of a plurality of possible flight paths is taken by the SAR when capturing the image. The mitigation can be performed differently for different ones of the flight paths.

24 Claims, 4 Drawing Sheets

FLIGHT PATH-DRIVEN MITIGATION OF WAVEFRONT CURVATURE EFFECTS IN SAR IMAGES

This invention was developed under Contract DE-AC04-94AL85000 between Sandia Corporation and the U.S. Department of Energy. The U.S. Government has certain rights in this invention.

FIELD OF THE INVENTION

The invention relates generally to synthetic aperture radar (SAR) and, more particularly, to mitigation of a wavefront curvature effect in a complex image produced using SAR techniques.

BACKGROUND OF THE INVENTION

Synthetic aperture radar (SAR) is a technique whereby multiple pulses from a moving radar are coherently combined to form an image while achieving an azimuth resolution much finer than the beamwidth of the radar's real antenna. Range resolution is a function of radar signal bandwidth. Image formation is typically a computationally intensive operation. SAR design consequently favors transform techniques that ultimately only approximate the matched filter for each pixel location in the image. The approximations tend to be most accurate at the image focal point, nominally its center. Large scenes with relatively coarse resolutions tend to exhibit artifacts resulting from approximations to the spherical wavefronts. Small scenes at finer resolutions suffer more from range migration effects.

The Polar Format Algorithm (PFA) is a well-known technique for spotlight SAR image formation. It recognizes that the raw Linear FM (LFM) SAR data, when de-chirped, represent sample points in the Fourier space of the scene being imaged, most accurately at the scene center, but suitably so for a significant neighborhood around the scene center, often for up to several thousand pixels depending on range and wavelength. At near ranges and longer wavelengths the focused image sizes may be substantially reduced. However, those raw data sample points are nominally on a polar grid in Fourier space, and need to be resampled to a rectangular grid for efficient processing with digital computers. This resampling is termed polar reformatting, hence the name Polar Format processing. FIG. 1 illustrates processing steps that implement conventional PFA. The familiar range and azimuth alignment operations are respectively performed at 11 and 13, followed by a two-dimensional DFT. The range alignment operation is shown by broken line to indicate that this part of the PFA process can, as is known in the art, be alternatively accomplished with conventional real-time motion compensation.

Although the resampling operation of PFA mitigates the problematic range migration, residual effects of wavefront curvature still manifest themselves as spatially variant distortions and image quality degradation, generally worsening in the image with pixel distance from the scene center. In fact, a threshold on tolerance for image degradation imposes a scene size limit for a focused SAR image. This limit is known in the art.

Some recently developed SAR systems have been operated in a manner to form images larger than the classical limits suggested for the Polar Format Algorithm (PFA). Such systems routinely operate with image dimensions (e.g., several thousand pixels by several thousand pixels) that often exceed the focused scene size limits for PFA processing. The desire for future operational systems to operate with ever-larger images at ever-finer resolutions exacerbates this problem.

Subaperture techniques combined with PFA have been shown effectively to mitigate wavefront curvature effects and substantially increase focused scene diameter. These techniques are implemented within image formation algorithms and are generally not suitable for application to an already processed image, unless the original image formation processing is first undone.

One conventional technique for post-processing PFA images applies a spatially variant filter to an already formed image, thereby correcting the misfocus due to residual wavefront curvature effects. This technique is sometimes referred to as Polar Formatting with Post Filtering (PF2) processing. However, the technique is designed for a linear flight path, and therefore has correspondingly limited robustness over imaging geometry.

It is desirable in view of the foregoing to provide for mitigation of a wavefront curvature effect in an already-formed radar image, without the aforementioned flight path limitations.

DETAILED DESCRIPTION

Figure 1:
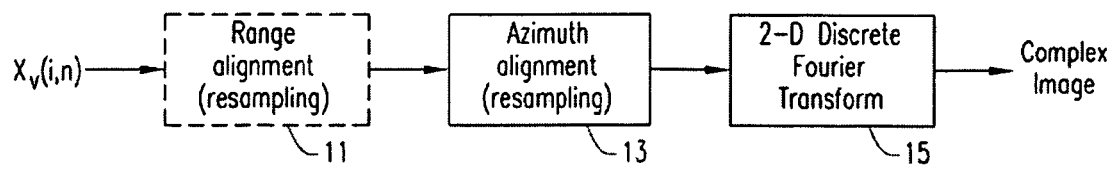
FIG. 1 diagrammatically illustrates conventional PFA processing.

Consider a conventional LFM transmitted signal of the form $$X_T(t, n) = A_T rect\left(\frac{t - t_n}{T}\right) \exp j\left\{\phi_{T,n} + \omega_{T,n}(t - t_n) + \frac{\gamma_{T,n}}{2}(t - t_n)^2\right\} \quad (1)$$

where
$A_T$=the amplitude of the transmitted pulse,
t=time,
n=index value of pulse number, $-N/2 \leq n \leq N/2$,
$t_n$=reference time of nth pulse,
T=transmitted pulse width,
$\phi_{T,n}$=transmit waveform reference phase of nth pulse,
$\omega_{T,n}$=transmit waveform reference frequency of nth pulse, and
$\gamma_{T,n}$=transmit waveform chirp rate of nth pulse. (2)

The received echo from a point scatterer is a delayed and attenuated version of this, namely $$X_R(t, n) = \frac{A_R}{A_T} X_T(t - t_{s,n}, n) \quad (3)$$

where
$A_R$=the amplitude of the received pulse,
$t_{s,n}$=echo delay time of the received echo for the nth pulse. (4)

This is expanded to $$X_R(t, n) = A_R \, \text{rect}\left(\frac{t - t_n - t_{s,n}}{T}\right) \exp j\left\{\phi_{T,n} + \omega_{T,n}(t - t_n - t_{s,n}) + \frac{\gamma_{T,n}}{2}(t - t_n - t_{s,n})^2\right\}. \quad (5)$$

The use of conventional stretch processing and Quadrature demodulation requires mixing $X_R$ with a Local Oscillator (LO) signal of the form $$X_L(t, n) = \text{rect}\left(\frac{t - t_n - t_{m,n}}{T_L}\right) \exp j\left\{\phi_{L,n} + \omega_{L,n}(t - t_n - t_{m,n}) + \frac{\gamma_{L,n}}{2}(t - t_n - t_{m,n})^2\right\} \quad (6)$$

where
$t_{m,n}$=reference delay time of nth LO pulse,
$T_L$=LO pulse width,
$\phi_{L,n}$=LO waveform reference phase of nth LO pulse,
$\omega_{L,n}$=LO waveform reference frequency of nth LO pulse, and
$\gamma_{L,n}$=LO waveform chirp rate of nth LO pulse. (7)

It is well-known in the art that the effect of such an LO signal can be achieved with a multitude of mixing stages that apply frequency and phase signals independent of one another, as long as their combined phase function is the same as in (6). This yields a baseband video signal of the form $$X_V(t,n) = X_R(t,n) X_L(t,n)^* \quad (8)$$

or $$X_V(t, n) = \begin{bmatrix} A_R \, \text{rect}\left(\frac{t - t_n - t_{s,n}}{T}\right) \text{rect}\left(\frac{t - t_n - t_{m,n}}{T_L}\right) \\ \times \exp j \left\{ \begin{array}{l} \phi_{T,n} + \omega_{T,n}(t - t_n - t_{s,n}) + \frac{\gamma_{T,n}}{2}(t - t_n - t_{s,n})^2 \\ -\phi_{L,n} - \omega_{L,n}(t - t_n - t_{m,n}) + \frac{\gamma_{L,n}}{2}(t - t_n - t_{m,n})^2 \end{array} \right\} \end{bmatrix} \quad (9)$$

which simplifies to $$X_V(t, n) = \begin{bmatrix} A_R \, \text{rect}\left(\frac{t - t_n - t_{s,n}}{T}\right) \text{rect}\left(\frac{t - t_n - t_{m,n}}{T_L}\right) \\ \times \exp j \left\{ \begin{array}{l} \phi_{T,n} + \phi_{L,n} + \omega_{T,n}(t - t_n - t_{s,n}) - \omega_{L,n}(t - t_n - t_{m,n}) \\ + \frac{\gamma_{L,n}}{2}(t - t_n - t_{s,n})^2 - \frac{\gamma_{L,n}}{2}(t - t_n - t_{m,n})^2 \end{array} \right\} \end{bmatrix}. \quad (10)$$

This model presumes $\phi_{L,n} = \phi_{T,n}$, $\omega_{L,n} = \omega_{T,n}$, $\gamma_{L,n} = \gamma_{T,n}$, (11)

which allows the reduction to $$X_V(t, n) = \begin{bmatrix} A_R \, \text{rect}\left(\frac{t - t_n - t_s}{T}\right) \text{rect}\left(\frac{t - t_n - t_m}{T_L}\right) \times \\ \exp j\left\{(\omega_{T,n} + \gamma_{T,n}(t - t_n - t_m))(t_m - t_s) + \frac{\gamma_{T,n}}{2}(t_m - t_s)^2\right\} \end{bmatrix}. \quad (12)$$

Now let $$t_{m,n} = t_{c,n} = \frac{2}{c}|r_{c,n}|, \quad (13)$$

$$t_{s,n} = \frac{2}{c}|r_{s,n}|,$$

$$(t - t_n - t_{c,n}) = (iT_{s,n} + \tau_n) \text{ for } -I/2 \le i < I/2,$$

where
$r_{c,n}$=the position vector of the radar with respect to the target scene center,
$r_{s,n}$=the position vector of the radar with respect to the target point,
i=the intra-pulse data index, $T_{s,n}$=the intra-pulse sampling interval, and
$\tau_n$=the intra-pulse sampling delay. (14)

which allows the sampled video data to be described as $$X_V(i,n) = A_R \exp j\left\{(\omega_{T,n} + \gamma_{T,n}\tau_n + \gamma_{T,n}T_{s,n}i)\frac{2}{c}(|r_{c,n}| - |r_{s,n}|) + \frac{2\gamma_{T,n}}{c^2}(|r_{c,n}| - |r_{s,n}|)^2\right\}. \quad (15)$$

Letting $$r_{cs,n} = (|r_{c,n}| - |r_{s,n}|) \quad (16)$$

and substituting into equation (15) yields $$X_V(i,n) = A_R \exp j\left\{(\omega_{T,n} + \gamma_{T,n}\tau_n + \gamma_{T,n}T_{s,n}i)\frac{2}{c}r_{cs,n} + \frac{2\gamma_{T,n}}{c^2}r_{cs,n}^2\right\}. \quad (17)$$

It becomes convenient to constrain $$(\omega_{T,n} + \gamma_{T,n}\tau_n + \gamma_{T,n}T_{s,n}i) = \kappa_n(\omega_0 + \gamma_0 T_{s,0}i) \quad (18)$$

where
$\omega_0$=the nominal or reference frequency,
$\gamma_0$=the nominal or reference chirp rate, and
$T_{s,0}$=the nominal or reference sample spacing, (19)
which allows $$X_V(i,n) = A_R \exp j\left\{\frac{2}{c}(\omega_0 + \gamma_0 T_{s,0}i)\kappa_n r_{cs,n} + \frac{2\gamma_{T,n}}{c^2}r_{cs,n}^2\right\}. \quad (20)$$

The second phase term is known as the residual video phase error (RVPE). This can be removed by data preprocessing, but can also often be ignored. Ignoring the RVPE will slightly degrade the image, and result in a slightly smaller focused scene diameter, the degree of which is exacerbated by short pulses with high chirp rates.

Figure 2:
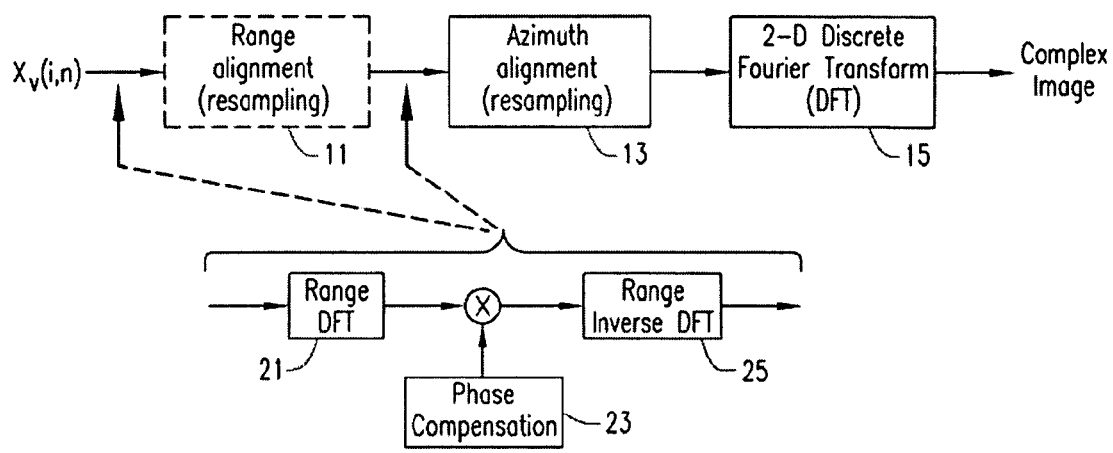
FIG. 2 diagrammatically illustrates how residual video phase error compensation is used in conjunction with PFA according to the prior art.

Removing the RVPE (also known as deskewing) entails filtering the data in the range dimension, and can be accomplished in the frequency domain by a Fourier Transform across range index i (see 21 in FIG. 2), followed by a phase correction (see 23 in FIG. 2), followed by an inverse Fourier Transform (see 25 in FIG. 2). This technique, well known in the art, is described below for clarity and completeness. The video data can be rewritten as $$X_V(i,n) + A_R \exp j\left\{\frac{2}{c}\omega_0\kappa_n r_{cs,n} + \frac{2\gamma_{T,n}}{c^2}r_{cs}^2 + \frac{2}{c}\gamma_0 T_{s,0}\kappa_n r_{cs,n}i\right\}. \quad (21)$$

The Discrete Fourier Transform (DFT) across index i is defined as $$X_V(v,n) = DFT_i(X_V(i,n)) = \sum_i X_V(i,n)\exp j\left\{-2\pi\frac{v}{V}i\right\}. \quad (22)$$

To facilitate the subsequent discussion, note that with index i such that $-I/2 \leq i \leq I/2$, the Discrete Fourier Transform of an exponential is given by $$DFT_i(\exp j\{\Omega i\}) = \sum_i \exp j\{\Omega i\}\exp j\left\{-2\pi\frac{v}{V}i\right\} = c\mathrm{sinc}_V\left(\frac{V}{2}\left(\Omega - \frac{2\pi}{V}v\right)\right) \quad (23)$$

where $$c\mathrm{sinc}_V(x) = \frac{\sin(x)}{\sin(x/V)}\exp j\left(-\frac{x}{V}\right). \quad (24)$$

Consequently, $$X_V(v,n) = \quad (25)$$
$$A_R \exp j\left\{\frac{2}{c}\omega_0\kappa_n r_{cs,n} + \frac{2\gamma_{T,n}}{c^2}r_{cs,n}^2\right\}DFT_i\left(\exp j\left\{\frac{2}{c}\gamma_0 T_{s,0}\kappa_n r_{cs,n}i\right\}\right)$$

or $$X_V(v,n) = \quad (26)$$
$$A_R \exp j\left\{\frac{2}{c}\omega_0\kappa_n r_{cs,n} + \frac{2\gamma_{T,n}}{c^2}r_{cs,n}^2\right\}c\mathrm{sinc}_V\left(\frac{V}{2}\left(\frac{2}{c}\gamma_0 T_{s,0}\kappa_n r_{cs,n} - \frac{2\pi}{V}v\right)\right).$$

The nature of the csinc function is to force a correspondence between $r_{cs,n}$ and index v such that, for each index v, $r_{cs,n}$ can be estimated as $$\hat{r}_{cs,n} = \frac{2\pi}{V}\left(\frac{c}{2\gamma_0 T_{s,0}\kappa_n}\right)v. \quad (27)$$

This permits compensating for the RVPE by a point-by-point phase correction of $$X'_V(v,n) = X_V(v,n)\exp j\left\{-\frac{2\gamma_{T,n}}{c^2}\hat{r}_{cs,n}^2\right\} \quad (28)$$

or $$X'_V(v,n) \approx A_R \exp j\left\{\frac{2}{c}\omega_0\kappa_n r_{cs,n}\right\}c\mathrm{sinc}_V\left(\frac{V}{2}\left(\frac{2}{c}\gamma_0 T_{s,0}\kappa_n r_{cs,n} - \frac{2\pi}{V}v\right)\right). \quad (29)$$

Performing an Inverse DFT (IDFT) on the corrected data of equation (29) results in a video signal with the RVPE compensated, namely $$X_V(i,n) = A_R \exp j\left\{\frac{2}{c}\omega_0\kappa_n r_{cs,n} + \frac{2}{c}\gamma_0 T_{s,0}\kappa_n r_{cs,n}i\right\}. \quad (30)$$

Consequently, whether ignored or compensated, this leaves us with a data model of $$X_V(i,n) = A_R \exp j\left\{\frac{2}{c}(\omega_0 + \gamma_0 T_{s,0}i)\kappa_n r_{cs,n}\right\}. \quad (31)$$

FIG. 2 illustrates examples of the use of RVPE compensation (i.e., removal of the RVPE term from equation (20)) in conjunction with the PFA of FIG. 1. As shown, by broken lines, RVPE can be applied before or after the range alignment 21 of the PFA processing.

Figure 3:
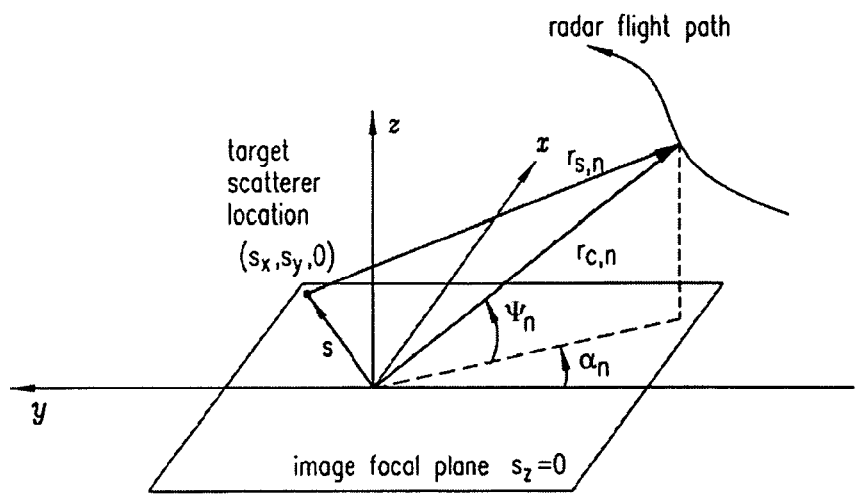
FIG. 3 illustrates a scene geometry associated with SAR applications.

Consider the geometry of FIG. 3, where s=the target scatterer location vector from the scene center, $\psi_{c,n}$=the grazing angle at the scene center, and $\alpha_n$=the instantaneous aperture viewing angle. (32)

Note that $$|r_{s,n}| = |r_{c,n} - s| \tag{33}$$

which allows $$r_{cs,n} = |r_{c,n}| - |r_{s,n}| = |r_{c,n}| - |r_{c,n} - s|. \tag{34}$$

In general, $r_{c,n}$ and $r_{s,n}$ vary with index n. This in fact defines the synthetic aperture. However $$|r_{c,n} - s| = \sqrt{|r_{c,n} - s|^2} = \sqrt{(r_{c,n} - s) \cdot (r_{c,n} - s)} = \sqrt{|r_{c,n}|^2 - 2r_{c,n} \cdot s + |s|^2} \tag{35}$$

or, more conveniently, $$|r_{c,n} - s| = |r_{c,n}|\sqrt{1 - \frac{2r_{c,n} \cdot s}{|r_{c,n}|^2} + \frac{|s|^2}{|r_{c,n}|^2}} = |r_{c,n}|\sqrt{1 - \frac{2n_{c,n} \cdot s}{|r_{c,n}|} + \frac{|s|^2}{|r_{c,n}|^2}} \tag{36}$$

where $r_{c,n} = |r_{c,n}| n_{c,n}$.

By using the expansion $$\sqrt{1+a} = 1 + \frac{a}{2} - \frac{a^2}{8} + \ldots \tag{37}$$

equation (36) can be written as $$|r_{c,n} - s| = |r_{c,n}|\left(1 + \frac{-\frac{2n_{c,n} \cdot s}{|r_{c,n}|} + \frac{|s|^2}{|r_{c,n}|^2}}{2} - \frac{\left(-\frac{2n_{c,n} \cdot s}{|r_{c,n}|} + \frac{|s|^2}{|r_{c,n}|^2}\right)^2}{8} + \ldots\right) \tag{38}$$

or $$|r_{c,n} - s| = \tag{39}$$

$$\left(|r_{c,n}| - (n_{c,n} \cdot s) + \frac{|s|^2}{2|r_{c,n}|} - \frac{(n_{c,n} \cdot s)^2}{2|r_{c,n}|} + \frac{(n_{c,n} \cdot s)}{2}\frac{|s|^2}{|r_{c,n}|^2} - \frac{|s|^4}{8|r_{c,n}|^3} + \ldots\right)$$

which yields $$r_{cs,n} = (n_{c,n} \cdot s) + \frac{(n_{c,n} \cdot s)^2}{2|r_{c,n}|} - \frac{|s|^2}{2|r_{c,n}|} - \frac{(n_{c,n} \cdot s)}{2}\frac{|s|^2}{|r_{c,n}|^2} + \frac{|s|^4}{8|r_{c,n}|^3} - \ldots \tag{40}$$

Conventional PFA simplifies this to just the first term, but acknowledges the second term as the principal source of residual phase error limiting the focused scene diameter. Terms beyond this are typically ignored in conventional treatments (but this can lead to some errors).

Equation (40) can be written as $$r_{cs,n} = (n_{c,n} \cdot s) + r_{pe,n} \tag{41}$$

where the complete range error is $$r_{pe,n} = r_{cs,n} - (n_{c,n} \cdot s) = |r_{c,n}|\left(1 - \sqrt{1 - \frac{2n_{c,n} \cdot s}{|r_{c,n}|} + \frac{|s|^2}{|r_{c,n}|^2}}\right) - (n_{c,n} \cdot s). \tag{42}$$

The video signal data model can then be written as $$X_V(i,n) = A_R \exp j\left\{\frac{2}{c}(\omega_0 + \gamma_0 T_{s,0} i)\kappa_n((n_{c,n} \cdot s) + r_{pe,n})\right\} \tag{43}$$

and further expanded to $$X_V(i,n) = A_R \exp j\left\{\frac{2}{c}(\omega_0 + \gamma_0 T_{s,0} i)\kappa_n(n_{c,n} \cdot s) + \phi_{pe,n}\right\} \tag{44}$$

where $\phi_{pe,n}$, the phase error, is given by $$\phi_{pe,n} = \frac{2}{c}(\omega_0 + \gamma_0 T_{s,0} i)\kappa_n r_{pe,n}. \tag{45}$$

As previously stated, the usual approximation for the range error is $$r_{pe,n} \approx \frac{(n_{c,n} \cdot s)^2}{2|r_{c,n}|}, \tag{46}$$

which is the second term on the right side of equation (40). From the geometry, for a flat target scene $$(n_{c,n} \cdot s) = s_x \cos\psi_{c,n} \sin\alpha_n - s_y \cos\psi_{c,n} \cos\alpha_n = \cos\psi_{c,n}\cos\alpha_n(s_x \tan\alpha_n - s_y) \tag{47}$$

and consequently $$r_{pe,n} \approx \frac{(\cos\psi_{c,n}\cos\alpha_n(s_x\tan\alpha_n - s_y))^2}{2|r_{c,n}|} = \tag{48}$$

$$\frac{\cos^2\psi_{c,n}\cos^2\alpha_n(s_x\tan\alpha_n - s_y)^2}{2|r_{c,n}|}.$$

Note that $r_{pe,n}$ can also be expanded to $$r_{pe,n} \approx \frac{\cos^2\psi_{c,n}(s_x^2\sin^2\alpha_n + s_y^2\cos^2\alpha_n - 2s_x s_y \sin\alpha_n\cos\alpha_n)}{2|r_{c,n}|} \tag{49}$$

or $$r_{pe,n} \approx \frac{\cos^2\psi_{c,n}(s_x^2\sin^2\alpha_n + s_y^2(1 - \sin^2\alpha_n) - 2s_x s_y \sin\alpha_n\cos\alpha_n)}{2|r_{c,n}|} \tag{50}$$

or $$r_{pe,n} \approx \frac{\cos^2\psi_{c,n}((s_x^2 - s_y^2)\sin^2\alpha_n + s_y^2 - 2s_x s_y \sin\alpha_n \cos\alpha_n)}{2|r_{c,n}|}. \quad (51)$$

Small angle approximations yield $$r_{pe,n} \approx \left(\frac{1}{2|r_{c,n}|}\right)\left(\cos^2\psi_{c,n}(s_x^2 - s_y^2)\alpha_n^2 - 2s_x s_y \cos^2\psi_{c,n}\left(1 - \frac{\alpha_n^2}{2}\right)\alpha_n + s_y^2 \cos^2\psi_{c,n}\right). \quad (52)$$

For focused scene diameter analysis, conventional treatments often further simplify to $$r_{pe,n} \approx \frac{\cos^2\psi_{c,n}(s_x^2 - s_y^2)}{2|r_{c,n}|}\alpha_n^2. \quad (53)$$

When inserted into the expression for phase error (equation (45)), and ignoring the dependence on range index i, this becomes the phase error term $$\phi_{pe,n} = \frac{2\omega_0}{c}\kappa_n \frac{\cos^2\psi_{c,n}(s_x^2 - s_y^2)}{2|r_{c,n}|}\alpha_n^2. \quad (54)$$

The conventional further simplification for finding maximum scene size includes $$\left(\frac{\omega_0}{c}\right) = \frac{2\pi}{\lambda_0}, \quad (55)$$
$$\kappa_n = 1,$$
$$\cos\psi_{c,n} = \cos\psi_{c,0},$$
$$|r_{c,n}| = |r_{c,0}|,$$

where
  $\lambda_0$=the nominal wavelength of the radar waveform, and
  $\psi_{c,0}$=the nominal reference grazing angle. (56)

This is tantamount to assuming a synthetic aperture that is a segment of a horizontal circular flight path orbiting the scene center, with fixed range and grazing angle.

The foregoing assumptions and corresponding substitutions cause the phase error term to become quadratic, $$\phi_{qpe,n} = \left(\frac{2\pi}{\lambda_0}\right)\cos^2\psi_{c,0}\frac{(s_x^2 - s_y^2)}{2|r_{c,0}|}\alpha_n^2. \quad (57)$$

The common derivation of maximum scene diameter is calculated along the cardinal axes passing through the scene center, and equates $$s_x^2 \leq \left(\frac{D_x}{2}\right)^2 \text{ when } s_y = 0, \quad (58)$$

$$s_y^2 \leq \left(\frac{D_y}{2}\right)^2 \text{ when } s_x = 0,$$

$$\alpha_n^2 \leq \left(\frac{\lambda_0}{4\rho_x \cos\psi_{c,0}}\right)^2,$$

where
  $\rho_x$=the nominal azimuth resolution of the radar. (59)

For azimuth scene diameter $D_x$ the following constraint applies $$\left\{\left(\frac{2\pi}{\lambda_0}\right)\cos^2\psi_{c,0}\left(\frac{\left(\frac{D_x}{2}\right)^2}{|r_{c,0}|}\right)\left(\frac{\lambda_0}{4\rho_x \cos\psi_{c,0}}\right)^2\right\} \leq \phi_{qpe,max} \quad (60)$$

which reduces to $$D_x^2 \leq (4\rho_x)^2\left(\frac{|r_{c,0}|}{\lambda_0}\right)\left(\frac{\phi_{qpe,max}}{\frac{\pi}{2}}\right), \quad (61)$$

or the more familiar $$D_x \leq (4\rho_x)\sqrt{\left(\frac{|r_{c,0}|}{\lambda_0}\right)\left(\frac{\phi_{qpe,max}}{\frac{\pi}{2}}\right)}. \quad (62)$$

In a similar fashion, the range scene diameter is $$D_y \leq (4\rho_x)\sqrt{\left(\frac{|r_{c,0}|}{\lambda_0}\right)\left(\frac{\phi_{pe,max}}{\frac{\pi}{2}}\right)}. \quad (63)$$

These are conventionally accepted limits for PFA processing. These scene diameter limits can be written in terms of number of pixels as $$P_x = \frac{D_x}{\rho_x/a_{os,x}} \leq 4a_{os,x}\sqrt{\left(\frac{|r_{c,0}|}{\lambda_0}\right)\left(\frac{\phi_{qpe,max}}{\frac{\pi}{2}}\right)}, \quad (64)$$

$$P_y = \frac{D_y}{\rho_y/a_{os,y}} \leq 4a_{os,y}\left(\frac{\rho_x}{\rho_y}\right)\sqrt{\left(\frac{|r_{c,0}|}{\lambda_0}\right)\left(\frac{\phi_{qpe,max}}{\frac{\pi}{2}}\right)},$$

where
  $a_{os,x}$=the ratio of resolution to pixel spacing in azimuth, and
  $a_{os,y}$=the ratio of resolution to pixel spacing in range. (65)

The video signal data model of equation (44) can be expanded to $$X_V(i, n) = \tag{68}$$
$$A_R \exp j \left\{ \frac{2}{c}(\omega_0 + \gamma_0 T_{s,0} i) \kappa_n \cos\psi_{c,n} \cos\alpha_n (s_x \tan\alpha_n - s_y) + \phi_{pe,n} \right\}.$$

A fundamental operation for polar reformatting effects $$\kappa_n \cos\psi_{c,n} \cos\alpha_n = \cos\psi_{c,0} \tag{69}$$

such that $$X_V(i, n) = A_R \exp j \left\{ \frac{2}{c}(\omega_0 + \gamma_0 T_{s,0} i) \cos\psi_{c,0} (s_x \tan\alpha_n - s_y) + \phi_{pe,n} \right\}. \tag{70}$$

For real-time image formation, this motion compensation is a fundamental operation for polar reformatting, and can be accomplished conventionally, e.g. by real-time waveform parameter manipulation, or by real-time data interpolation after digital sampling. With real-time motion compensation, the phase error becomes $$\phi_{pe,n} = \frac{2}{c}(\omega_0 + \gamma_0 T_{s,0} i) \frac{\cos\psi_{c,0}}{\cos\psi_{c,n} \cos\alpha_n} r_{pe,n}. \tag{71}$$

As previously stated, the usual approximation for the range error is given by equation (46). However, for purposes of exposition, an extra term (from equation (40)) is carried here, to provide the approximation $$r_{pe,n} \approx \frac{(n_{c,n} \cdot s)^2}{2|r_{c,n}|} - \frac{|s|^2}{2|r_{c,n}|} = \frac{(n_{c,n} \cdot s)^2 - |s|^2}{2|r_{c,n}|}. \tag{73}$$

Recall from the geometry that, for a flat target scene $$(n_{c,n} \cdot s) = s_x \cos\omega_{c,n} \sin\alpha_n - s_y \cos\psi_{c,n} \cos\alpha_n = \cos\psi_{c,n} \cos\alpha_n (s_x \tan\alpha_n - s_y) \tag{74}$$

and $$r_{pe,n} \approx \frac{\cos^2\psi_{c,n} \cos^2\alpha_n (s_x \tan\alpha_n - s_y)^2 - s_x^2 - s_y^2}{2|r_{c,n}|}. \tag{75}$$

Using the identity $$\cos^2\alpha_n = \frac{1}{1 + \tan^2\alpha_n} \tag{76}$$

$r_{pe,n}$ can also be expanded to $$r_{pe,n} \approx \frac{\cos^2\psi_{c,n}(s_x \tan\alpha_n - s_y)^2 - s_x^2(1 + \tan^2\alpha_n) - s_y^2(1 + \tan^2\alpha_n)}{2|r_{c,n}|(1 + \tan^2\alpha_n)} \tag{77}$$

or $$r_{pe,n} \approx \frac{(s_x^2 \cos^2\psi_{c,n} - s_x^2 - s_y^2)\tan^2\alpha_n - 2s_y s_x \cos^2\psi_{c,n} \tan\alpha_n + s_y^2(\cos^2\psi_{c,n} - 1)}{2|r_{c,n}|(1 + \tan^2\alpha_n)}. \tag{78}$$

Inserting this into the expression for phase error (equation (71)) yields $$\phi_{pe,n} \approx \tag{79}$$
$$\left\{ \frac{2}{c}(\omega_0 + \gamma_0 T_{s,0} i) \left( \frac{\cos\psi_{c,0}}{\cos\psi_{c,n}} \right) \left( \frac{(s_x^2 \cos^2\psi_{c,n} - s_x^2 - s_y^2)\tan^2\alpha_n - 2s_y s_x \cos^2\psi_{c,n} \tan\alpha_n + s_y^2(\cos^2\psi_{c,n} - 1) - s_x^2}{(1 + \tan^2\alpha_n)\cos\alpha_n} \right) \right\}$$

or $$\phi_{pe,n} \approx \tag{80}$$
$$\left\{ \left( \frac{\omega_0 + \gamma_0 T_{s,0} i}{c|r_{c,n}|} \right) \left( \frac{\cos\psi_{c,0}}{\cos\psi_{c,n}} \right) \left( \frac{(s_x^2 \cos^2\psi_{c,n} - s_x^2 - s_y^2)\tan^2\alpha_n - 2s_y s_x \cos^2\psi_{c,n} \tan\alpha_n + s_y^2(\cos^2\psi_{c,n} - 1) - s_x^2}{\sqrt{1 + \tan^2\alpha_n}} \right) \right\}.$$

For a circular flight path using constant range and constant grazing angle, this can be written as $$\phi_{pe,n} \approx \left\{ \left( \frac{\omega_0 + \gamma_0 T_{s,0} i}{c|r_{c,0}|} \right) \left( \frac{(s_x^2 \cos^2\psi_{c,n} - s_x^2 - s_y^2)\tan^2\alpha_n - 2s_y s_x \cos^2\psi_{c,0} \tan\alpha_n + s_y^2(\cos^2\psi_{c,0} - 1) - s_x^2}{\sqrt{1 + \tan^2\alpha_n}} \right) \right\}. \tag{81}$$

Conventional PFA processing will resample data to be linear in $\tan\alpha_n$, so the phase error can be expanded into a series in $\tan\alpha_n$ $$\phi_{pe,n} \approx \left\{ \left( \frac{\omega_0 + \gamma_0 T_{s,0} i}{c|r_{c,0}|} \right) \right. \tag{82}$$
$$\left. \left( \begin{array}{c} +s_y^2 2(\cos^2\psi_{c,0} - 1) - 2s_x^2 - 4s_y s_x \cos^2\psi_{c,0} \tan\alpha_n - \\ (s_x^2(1 - 2\cos^2\psi_{c,n}) + s_y^2(1 + \cos^2\psi_{c,0}))\tan^2\alpha_n \end{array} \right) \right\}.$$

The quadratic term of the series of equation (82) is $$\phi_{qpe,n} \approx \left(\frac{\omega_0 + \gamma_0 T_{s,0} i}{2c|r_{c,0}|}\right)(-s_x^2(1 - 2\cos^2\psi_{c,0}) - s_y^2(1 + \cos^2\psi_{c,0}))\tan^2\alpha_n. \quad (83)$$

Ignoring the dependence on range index i, and using some conventional simplifications previously identified, yields $$\phi_{qpe,n} \approx \left(\frac{2\pi}{\lambda_0}\right)\left(\frac{-s_x^2(1 - 2\cos^2\psi_{c,0}) - s_y^2(1 + \cos^2\psi_{c,0})}{2c|r_{c,0}|}\right)\tan^2\alpha_n. \quad (84)$$

The substitutions previously indicated can be used to find maximum scene diameters, with the exception that now, more accurately $$\tan^2\alpha_n \leq \left(\frac{\lambda_0}{4\rho_x \cos\psi_{c,0}}\right)^2. \quad (85)$$

Consequently, $$D_x \leq 4\rho_x \sqrt{\left(\frac{|r_{c,0}|}{\lambda_0}\right)\left(\frac{2\cos^2\psi_{c,0}}{1 - 2\cos^2\psi_{c,0}}\right)\left(\frac{\phi_{qpe,max}}{\frac{\pi}{2}}\right)} \quad (86)$$

and $$D_y \leq 4\rho_x \sqrt{\left(\frac{|r_{c,0}|}{\lambda_0}\right)\left(\frac{2\cos^2\psi_{c,0}}{1 + \cos^2\psi_{c,0}}\right)\left(\frac{\phi_{qpe,max}}{\frac{\pi}{2}}\right)}. \quad (87)$$

One obvious result of the motion compensation or resampling is to modify the focused scene size limits as a function of grazing angle. The scene diameter limits can be rewritten as $$D_x \leq \zeta_x(4\rho_x)\sqrt{\left(\frac{|r_{c,0}|}{\lambda_0}\right)\left(\frac{\phi_{qpe,max}}{\frac{\pi}{2}}\right)} \quad (88)$$

and $$D_y \leq \zeta_y(4\rho_x)\sqrt{\left(\frac{|r_{c,0}|}{\lambda_0}\right)\left(\frac{\phi_{qpe,max}}{\frac{\pi}{2}}\right)}. \quad (89)$$

where the scale factors due to grazing angle are given by $$\zeta_x = \sqrt{\left(\frac{2\cos^2\psi_{c,0}}{1 - 2\cos^2\psi_{c,0}}\right)} = \text{Scene azimuth diameter scale factor, and}$$

$$\zeta_y = \sqrt{\left(\frac{2\cos^2\psi_{c,0}}{1 + 2\cos^2\psi_{c,0}}\right)} = \text{Scene range diameter scale factor.}$$

(90)

Note that in general the focused scene diameter limits in azimuth are larger than the conventional equation would predict, and the focused scene diameter limits in range are slightly less than the conventional equation would predict. Consider, for example, a Ku-band (16.8 GHz) SAR operating at a 10 km range and 30-degree grazing angle on a circular flight path. The image resolution is 0.1 m on the ground in both dimensions, and is over-sampled by 20%. Allowable peak quadratic phase error is 90 degrees. The focused scene diameter would be 6200 pixels in azimuth by 3300 pixels in range.

Although the foregoing descriptions have tacitly presumed a circular flight path with constant grazing angle and range, it has been shown that the grazing angle can have a significant impact on focused scene diameter limits. The focused scene diameter limits can also vary with other geometries. This can be explored by examining another specific example of radar imaging geometry that is common in SAR operation, namely, level straight-line flight with broadside imaging. The approximate phase error expression of equation (80) can be used, recognizing that grazing angle and range will vary during the course of the synthetic aperture, in accordance with the fight path.

Using the geometry definitions of FIG. 3, the radar location vector $r_{c,n}$ can be represented by the 3-tuple $(x_{c,n}, y_{c,n}, z_{c,n})$. Straight and level flight that is broadside to the scene center at the aperture center is defined by the relationships $$\tan\alpha_n = \frac{x_{c,n}}{-y_{c,n}}, \quad (92)$$

$$\cos\psi_{c,n} = \left(\frac{\sqrt{x_{c,n}^2 + y_{c,n}^2}}{\sqrt{x_{c,n}^2 + y_{c,n}^2 + z_{c,n}^2}}\right),$$

$$|r_{c,n}| = \sqrt{x_{c,n}^2 + y_{c,n}^2 + z_{c,n}^2},$$

where $y_{c,n} = y_{c,0}$, and $z_{c,n} = z_{c,0}$. (93)

The relationships of equations (92) and (93), together with selected trigonometric identities, yield $$\tan\alpha_n = \frac{x_{c,n}}{-y_{c,n}}, \quad (94)$$

$$\cos\alpha_n = \frac{-y_{c,0}}{\sqrt{x_{c,n}^2 + y_{c,0}^2}} = \frac{1}{\sqrt{1 + \tan^2\alpha_n}},$$

$$\cos\psi_{c,n} = \left(\frac{\sqrt{x_{c,n}^2 + y_{c,0}^2}}{\sqrt{x_{c,n}^2 + y_{c,0}^2 + z_{c,0}^2}}\right) = \left(\frac{\sqrt{1 + \tan^2\alpha_n}}{\sqrt{1 + \tan^2\psi_{c,0} + \tan^2\alpha_n}}\right),$$

$$|r_{c,0}| = \sqrt{x_{c,n}^2 + y_{c,0}^2 + z_{c,0}^2}, = |r_{c,0}|\cos\psi_{c,0} = \sqrt{1 + \tan^2\psi_{c,0} + \tan^2\alpha_n}.$$

The phase error then becomes $$\phi_{pe,n} \approx \left\{ \left(\frac{\omega_0 + \gamma_0 T_{s,0} i}{c}\right) \cos\psi_{c,0} \left( \frac{\begin{pmatrix} \left(s_x^2\left(\frac{1+\tan^2\alpha_n}{1+\tan^2\psi_{c,0}+\tan^2\alpha_n}\right) - s_x^2 - s_y^2\right)\tan^2\alpha_n \\ -2s_y s_x \left(\frac{1+\tan^2\alpha_n}{1+\tan^2\psi_{c,0}+\tan^2\alpha_n}\right)\tan\alpha_n \\ +s_y^2\left(\frac{1+\tan^2\alpha_n}{1+\tan^2\psi_{c,0}+\tan^2\alpha_n} - 1\right) - s_x^2 \end{pmatrix}}{|r_{c,0}|\cos\psi_{c,0}\sqrt{1+\tan^2\alpha_n}\sqrt{1+\tan^2\alpha_n}} \right) \right\} \quad (95)$$

which simplifies to $$\phi_{pe,n} \approx \left(\frac{\omega_0 + \gamma_0 T_{s,0} i}{c|r_{c,0}|}\right) \left(\frac{-s_x^2 - (s_x^2 + s_y^2)\tan^2\psi_{c,0} - 2s_y s_x \tan\alpha_n - s_y^2\tan^2\alpha_n}{(1+\tan^2\psi_{c,0}+\tan^2\alpha_n)}\right) \quad (96)$$

For small angles, this can be approximated by the series $$\phi_{pe,n} \approx \left(\frac{\omega_0 + \gamma_0 T_{s,0} i}{c|r_{c,0}|(1+\tan^2\psi_{c,0})}\right) \begin{bmatrix} -(s_x^2 + (s_x^2 + s_y^2)\tan^2\psi_{c,0}) - 2s_y s_x \tan\alpha_n + \\ \left(\frac{s_x^2 + (s_x^2 + s_y^2)\tan^2\psi_{c,0}}{1+\tan^2\psi_{c,0}} - s_y^2\right)\tan^2\alpha_n + \\ \left(\frac{2s_y s_x}{1+\tan^2\psi_{c,0}}\right)\tan^3\alpha_n + \left(\frac{s_y^2}{1+\tan^2\psi_{c,0}}\right)\tan^4\alpha_n \end{bmatrix} \quad (97)$$

or $$\phi_{pe,n} = \left(\frac{\omega_0 + \gamma_0 T_{s,0} i}{c|r_{c,0}|(1+\tan^2\psi_{c,0})}\right) \begin{bmatrix} -(s_x^2 + (s_x^2 + s_y^2)\tan^2\psi_{c,0}) - 2s_y s_x \tan\alpha_n + \\ \left(\frac{s_x^2 - (s_y^2 + s_x^2)\tan^2\psi_{c,0}}{1+\tan^2\psi_{c,0}}\right)\tan^2\alpha_n + \\ \left(\frac{2s_y s_x}{1+\tan^2\psi_{c,0}}\right)\tan^3\alpha_n + \left(\frac{s_y^2}{1+\tan^2\psi_{c,0}}\right)\tan^4\alpha_n \end{bmatrix} \quad (98)$$

The quadratic term within phase error equation (98) above can be extracted as $$\phi_{qpe,n} = \left(\frac{(\omega_0 + \gamma_0 T_{s,0} i)}{c|r_{c,0}|(1+\tan^2\psi_{c,0})}\right)\left(\frac{s_x^2 - s_y^2 + s_x^2\tan^2\psi_{c,0}}{1+\tan^2\psi_{c,0}}\right)\tan^2\alpha_n, \quad (99)$$

simplified to $$\phi_{qpe,n}\left(\frac{2\pi}{\lambda_0}\right)\frac{1}{|r_{c,0}|}\left(\frac{s_x^2}{(1+\tan^2\psi_{c,0})} - \frac{s_y^2}{(1+\tan^2\psi_{c,0})^2}\right)\tan^2\alpha_n, \quad (100)$$

and further simplified to $$\phi_{qpe,n}\left(\frac{2\pi}{\lambda_0}\right)\frac{\cos^2\psi_{c,0}}{|r_{c,0}|}(s_x^2 - s_y^2\cos^2\psi_{c,0})\tan^2\alpha_n. \quad (101)$$

Making the same substitutions as in the circular flight path discussion yields $$D_x \leq 4\rho_x \sqrt{\left(\frac{|r_{c,0}|}{\lambda_0}\right)\left(\frac{\phi_{qpe,max}}{\frac{\pi}{2}}\right)}, \quad (102)$$

and $$D_y \leq 4\rho_x \sqrt{\left(\frac{|r_{c,0}|}{\lambda_0}\right)\left(\frac{\phi_{qpe,max}}{\frac{\pi}{2}}\right)}. \quad (103)$$

By recognizing that the slant-range scene diameter is $$D_r = D_y \cos\psi_{c,0} \quad (104)$$

The following relationship can be derived $$D_y \leq 4\rho_x \sqrt{\left(\frac{|r_{c,0}|}{\lambda_0}\right)\left(\frac{\phi_{qpe,max}}{\frac{\pi}{2}}\right)}. \quad (105)$$

The expressions for $D_x$ and $D_y$ (in equations (102) and (105)) are the same as the classical limits.

Consider now another specific radar imaging geometry that is common in SAR operation, namely, level straight-line flight with squinted imaging. This will cause additional distortions and defocusing. The approximate phase error expression of equation (80) can be used, recognizing that grazing angle and range will vary during the course of the synthetic aperture in a manner consistent with the straight-line flight path and squinted imaging. Returning again to the geometry definitions of FIG. 3, straight and level flight that is squinted to the scene center at the aperture center produces the following relationships $$\tan \alpha_n = \frac{x_{c,n}}{-y_{c,n}}, \quad (107)$$

$$\cos \psi_{c,n} = \left(\frac{\sqrt{x_{c,n}^2 + y_{c,n}^2}}{\sqrt{x_{c,n}^2 + y_{c,n}^2 + z_{c,n}^2}}\right),$$

$$|r_{c,n}| = \sqrt{x_{c,n}^2 + y_{c,n}^2 + z_{c,n}^2},$$

where now $$y_{c,n} = y_{c,0} + x_{c,n} \cot \theta_s, \text{ and}$$

$$z_{c,n} = z_{c,0}. \quad (108)$$

Figure 4:
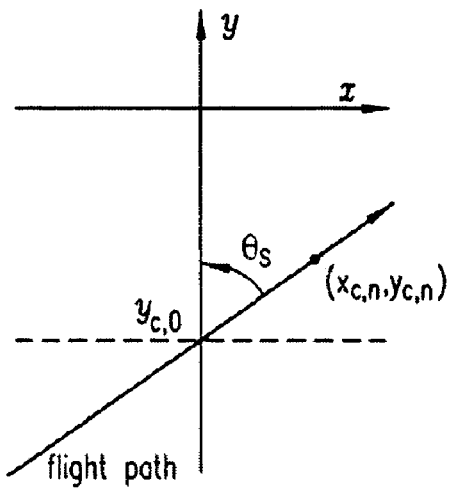
FIG. 4 illustrates scene geometry associated with straight and level flight that is squinted to the scene center at the aperture center.

This geometry is illustrated in FIG. 4. Note that with $\theta_s = 90$ degrees, this geometry simplifies to the broadside imaging case.

The relationships of equations (107) and (108), together with selected trigonometric identities, yield $$\tan \alpha_n = \frac{x_{c,n}}{-(y_{c,0} + x_{c,n} \cot \theta_s)}, \quad (109)$$

$$\cos \psi_{c,n} = \left(\frac{\sqrt{x_{c,n}^2 + (y_{c,0} + x_{c,n} \cot \theta_s)^2}}{\sqrt{x_{c,n}^2 + (y_{c,0} + x_{c,n} \cot \theta_s)^2 + z_{c,0}^2}}\right),$$

$$|r_{c,n}| = \sqrt{x_{c,n}^2 + (y_{c,0} + x_{c,n} \cot \theta_s)^2 + z_{c,0}^2},$$

which can be manipulated to $$x_{c,n} = \frac{-y_{c,0} \tan \alpha_n}{(1 + \cot \theta_s \tan \alpha_n)}, \quad (11)$$

$$\cos \psi_{c,n} = \left(\frac{\sqrt{1 + \tan^2 \alpha_n}}{\sqrt{1 + \tan^2 \alpha_n + \tan^2 \psi_{c,0}(1 + \cot \theta_s \tan \alpha_n)^2}}\right),$$

$$|r_{c,n}| = \frac{|r_{c,0}| \cos \psi_{c,0}}{(1 + \cot \theta_s \tan \alpha_n)} \sqrt{1 + \tan^2 \alpha_n + \tan^2 \psi_{c,0}(1 + \cot \theta_s \tan \alpha_n)^2}.$$

The phase error then becomes $$\phi_{pe,n} \approx \left\{ \frac{\left(\frac{\omega_0 + \gamma_0 T_{s,0} i}{c}\right) \cos \psi_{c,0} \times \left(\left[\left(s_x^2\left(\frac{1 + \tan^2 \alpha_n}{1 + \tan^2 \psi_{c,0}(1 + \cot \theta_s \tan \alpha_n)^2 + \tan^2 \alpha_n}\right) - s_x^2 - s_y^2\right]\tan^2 \alpha_n - 2s_y s_x\left(\frac{1 + \tan^2 \alpha_n}{1 + \tan^2 \psi_{c,0}(1 + \cot \theta_s \tan \alpha_n)^2 + \tan^2 \alpha_n}\right)\tan \alpha_n + s_y^2\left(\frac{1 + \tan^2 \alpha_n}{1 + \tan^2 \psi_{c,0}(1 + \cot \theta_s \tan \alpha_n)^2 + \tan^2 \alpha_n} - 1\right) - s_x^2\right)}{\left(\frac{|r_{c,0}| \cos \psi_{c,0}}{(1 + \cot \theta_s \tan \alpha_n)}\right)\sqrt{1 + \tan^2 \alpha_n}\sqrt{1 + \tan^2 \alpha_n}} \right\} \quad (111)$$

which reduces to $$\phi_{pe,n} \approx \left\{\left(\frac{\omega_0 + \gamma_0 T_{s,0} i}{c|r_{c,0}|}\right)\left(\frac{-s_x^2 - 2s_y s_x \tan \alpha_n - s_y^2 \tan^2 \alpha_n - (s_x^2 + s_y^2)\tan^2 \psi_{c,0}(1 + \cot \theta_s \tan \alpha_n)^2}{\frac{1 + \tan^2 \psi_{c,0}(1 + \cot \theta_s \tan \alpha_n)^2 + \tan^2 \alpha_n}{1 + \cot \theta_s \tan \alpha_n}}\right)\right\}. \quad (112)$$

For small angles, this can be approximated by a series for which the quadratic term can be extracted as $$\phi_{qpe,n} \approx \left(\frac{2\pi}{\lambda_0}\right)\frac{\cos^2 \psi_{c,0}}{|r_{c,0}|} \quad (113)$$

$$\left(\frac{(s_x^2 - s_y^2 \cos^2 \psi_{c,0}) + 2s_x s_y(1 - 2\cos^2 \psi_{c,0})\cot \theta_s + s_y^2(1 - 5\cos^2 \psi_{c,0} + 4\cos^4 \psi_{c,0})\cot^2 \theta_s}{1}\right)\tan^2 \alpha_n.$$

The following example is instructive as to the effects of squint angle on quadratic phase error. For the case of $\theta_s = 45$ degrees, and $\psi_{c,0} = 45$ degrees, the quadratic phase error is unaffected along the x-axis ($s_y = 0$). However, along the y-axis ($s_x = 0$), the quadratic phase error doubles from that for the broadside case. This implies a reduced focused scene diameter in the $s_y$ direction.

Recall from equations (42)-(45) that, after RVPE compensation, the residual phase error is $$\phi_{pe,n} = \quad (114)$$

$$\frac{2}{c}(\omega_0 + \gamma_0 T_{s,0} i)\kappa_n\left(|r_{c,n}|\left(1 - \sqrt{1 - \frac{2n_{c,n} \cdot s}{|r_{c,n}|} + \frac{|s|^2}{|r_{c,n}|^2}}\right) - (n_{c,n} \cdot s)\right).$$

Recall also from equations (40)-(45) that a reasonable approximation for the dominant characteristic of the phase error is $$\phi_{pe,n} \approx \frac{2}{c}(\omega_0 + \gamma_0 T_{s,0} i)\kappa_n \left(\frac{(n_{c,n} \cdot s)^2 - |s|^2}{2|r_{c,n}|}\right). \quad (115)$$

Incorporating real-time motion compensation (or an equivalent range interpolation) permits the dominant phase error to be expressed by equation (80). For the example of a circular flight path with constant range and grazing angle, and using conventional PFA processing, the phase error can be approximated by the series of equation (82)

Note the following with respect to equation (82):

Within the square brackets, the first and second terms are responsible for a spatially variant shift, that is, a geometric distortion in the image. This is most noticeable in large images with long linear features such as roads not appearing straight in spite of ground-truth indicating straightness.

The third term in the square brackets is quadratic in tan $\alpha_n$ and represents a quadratic phase error that defocuses the image in a spatially variant manner. Compensating only this term will substantially enhance focusing at points distant from the scene center, but will not address geometric distortions of the other terms.

The quadratic term does exhibit a relatively weak dependence in range index i, which can usually be ignored for all but the finest resolutions where chirp bandwidth becomes a large fraction of the radar center frequency.

For this geometry, i.e., straight and level flight that is squinted to the scene center at the aperture center, the quadratic term exhibits a significant dependence on grazing angle. As $\psi_{c,0}$ approaches 45 degrees, the dependence on azimuth position $s_x$ disappears. This is a consequence of (1) the circular flight path and range interpolation (which can be implemented via real-time motion compensation) and (2) including more terms (see equation (115)) than in the conventional phase error approximation. Ignoring these factors (as is typical in conventional treatments) can result in over-correcting for an error. This over-correction may in fact generate a larger quadratic error than originally existed. A tacit assumption is that tan $\alpha_n$ is linear in azimuth data index n. This is justified because the azimuth resampling involved in PFA processing will in fact force this relationship for any index i, although the constant of proportionality will depend on the specific index i.

Figure 5:
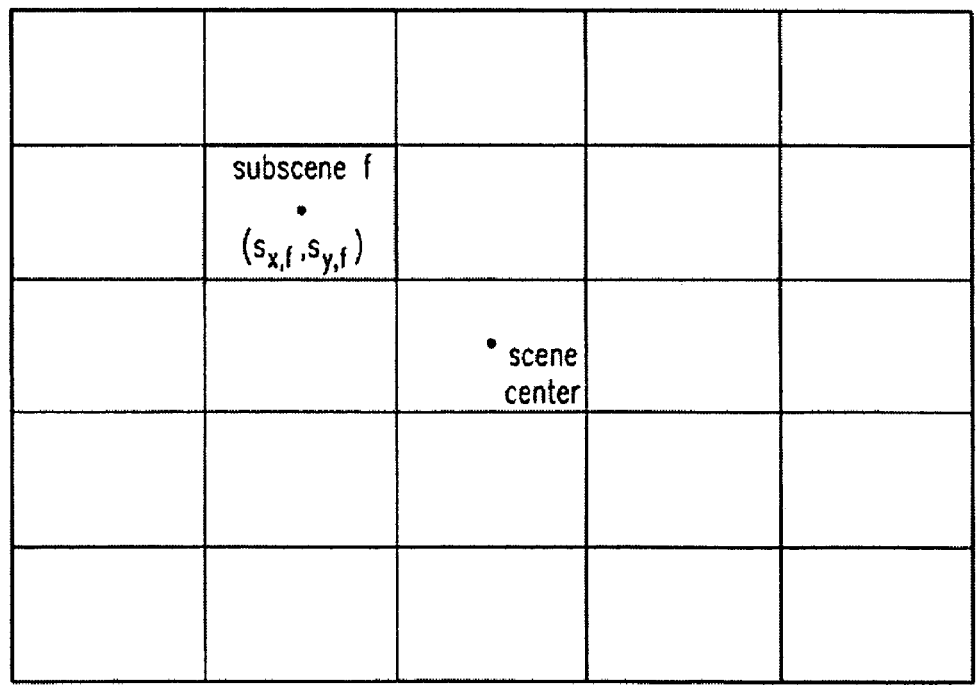
FIG. 5 illustrates a target scene divided into a plurality of sub-scenes according to exemplary embodiments of the invention.

Correcting for wavefront curvature effects requires compensation for the phase error terms that cause the problematic effects. Exemplary embodiments of the invention recognize that these effects, and the phase errors that cause them, are spatially variant. That is, the phase error functions are different in different parts, or sub-scenes, of the target scene. In some embodiments, the mitigation of wavefront curvature effects is different for different parts of the image, based on the expected degrading phase error functions for those parts of the image. These different parts of the image are also referred to as sub-images, which correspond respectively to sub-scenes of the complete target scene associated with the complete image. FIG. 5 illustrates an example of a target scene divided into a plurality of sub-scenes to facilitate the process of mitigating wavefront curvature effects.

Some embodiments mitigate wavefront curvature effects by de-convolving each sub-image with a suitable signal representation of the phase error function expected at the center of the sub-image. In some embodiments, the signal representation of the phase error function at the center of a particular sub-image, such as sub-image f, associated with sub-scene f in FIG. 5, is given by $$DFT\left(\exp j\{\phi_{pe,n}\}\,\Big|\, \begin{matrix} s_x = s_{x,f} \\ s_y = s_{y,f} \end{matrix}\right). \quad (118)$$

In some embodiments, it is convenient to implement the de-convolution of the sub-image with the signal representation of equation (118) as a convolution of the sub-image with the following signal representation $$DFT\left(\exp j\{-\phi_{pe,n}\}\,\Big|\, \begin{matrix} s_x = s_{x,f} \\ s_y = s_{y,f} \end{matrix}\right). \quad (118A)$$

The exponential terms in equations (118) and (118A) are complex conjugates of one another, so convolution of the sub-image with the signal representation of equation (118A) is equivalent to de-convolution of the sub-image with the signal representation of equation (118). The signal representation of equation (118A) is also referred to herein as a convolution kernel.

Because the phase error functions ($\phi_{pe,n}, \phi_{qpe,n}$) are different for different flight paths, the wavefront curvature effect mitigation operations will differ for different flight paths.

In some embodiments, the aforementioned convolution of a sub-image with the convolution kernel of equation (118A) is implemented as direct convolution, using an FIR (finite impulse response) filter according to conventional practice. In some embodiments, the convolution is implemented as fast convolution using DFTs and inverse DFTs according to conventional practice. In various embodiments, the sub-image size ranges from as small as a single pixel in either or both dimensions, to as large as is possible without producing unacceptable residual blurring. Larger sub-image sizes will generally allow more efficiency in processing. Larger sub-image sizes will allow greater phase error function discontinuities at the sub-image boundaries.

A generic approximation for the phase error can be obtained by rewriting equation (80) as $$\phi_{pe,n} \approx \left\{ \frac{\left(\frac{\omega_0 + \gamma_0 T_{s,0} i}{c}\right)\cos\psi_{c,0}}{\left[\begin{matrix}(s_x^2 \cos^2\psi_{c,n} - s_x^2 - s_y^2)\tan^2\alpha_n - \\ 2 s_y s_x \cos^2\psi_{c,n} \tan\alpha_n + \\ s_y^2(\cos^2\psi_{c,n} - 1) - s_x^2\end{matrix}\right]} {|r_{c,n}|\cos\psi_{c,n}\sqrt{1 + \tan^2\alpha_n}} \right\} \quad (119)$$

where the flight-path dependent terms have been combined inside the square brackets. This can be written in a series form $$\phi_{pe,n} \approx \left\{\left(\frac{\omega_0 + \gamma_0 T_{s,0} i}{c}\right) \right.$$
$$\left.\cos\psi_{c,0}\left[\varphi(0) + \frac{d\varphi(0)}{d\tan\alpha_n}\tan\alpha_n + \left(\frac{1}{2}\right)\frac{d^2\varphi(0)}{d\tan^2\alpha_n}\tan^2\alpha_n + \ldots\right]\right\} \quad (120)$$

where $$\varphi(\tan\alpha_n) = \frac{\begin{pmatrix} (s_x^2\cos^2\psi_{c,n} - s_x^2 - s_y^2)\tan^2\alpha_n - \\ 2s_y s_x \cos^2\psi_{c,n}\tan\alpha_n + s_y^2(\cos^2\psi_{c,n} - 1) - s_x^2 \end{pmatrix}}{|r_{c,n}|\cos\psi_{c,n}\sqrt{1+\tan^2\alpha_n}} \quad (121)$$

The expression in square brackets in equation (120) is the Taylor series expansion of φ(tan α$_n$) into a power series of tan α$_n$ about tan α$_n$=0. Of course, $|r_{c,n}|$ and $\psi_{c,n}$ are both also generally functions of tan α$_n$ in a manner defined by the specific flight path.

To correct the focus of the image, some embodiments assume that the significant portion of the phase error is the quadratic term in the power series of equation (120)

$$\phi_{qpe,n} \approx \left\{\left(\frac{\omega_0}{c}\right)\cos\psi_{c,0}\left[\left(\frac{1}{2}\right)\frac{d^2\varphi(0)}{d\tan^2\alpha_n}\tan^2\alpha_n\right]\right\}. \quad (122)$$

Compensation for defocusing is useful, for example, to improve resolution of target objects and scene elements. Some embodiments assume that the principal component contributing to azimuth shifting is the linear term in the power series of equation (120)

$$\phi_{pe,n} \approx \left\{\left(\frac{\omega_0}{c}\right)\cos\psi_{c,0}\left[\frac{d\varphi(0)}{d\tan\alpha_n}\tan\alpha_n\right]\right\}. \quad (123)$$

Some embodiments assume that the principal component contributing to range shifting is the term in equation (120) that is linear in index i, namely $$\phi_{pe,n} \approx \left\{\left(\frac{\gamma_0 T_{s,0} i}{c}\right)\cos\psi_{c,0}[\varphi(0)]\right\}. \quad (124)$$

Compensation for range and/or azimuth shifting (i.e., geometric warping compensation) is useful, for example, in registering the radar image with a Cartesian map, and facilitating distance measures and map coordinate extractions. Some embodiments combine defocusing compensation and geometric warping compensation to achieve a combination of benefits associated with both.

Turning again to scene diameter limits, with the complete target scene divided into sub-scenes (as shown in FIG. 5) that respectively correspond to sub-images of the complete complex image, let $k_{subimages,x}$=number of sub-images per row, and $k_{subimages,y}$=number of sub-images per column. (125)

Since each sub-image is now focused at its own center, each sub-image now enjoys, to first order, the scene size limits of the former uncompensated entire image. Consequently, to first order, the overall scene diameter limits have been extended by the number of sub-images per row, or column, as warranted. That is, $D_{x,compensated} \leq k_{subimages,x} D_{x,uncompensated}$, and $D_{y,compensated} \leq k_{subimages,y} D_{y,uncompensated}$. (126)

For the classical limits, $$D_{x,compensated} \leq k_{subimages,x}(4\rho_x)\sqrt{\left(\frac{|r_{c,0}|}{\lambda_0}\right)\left(\frac{\phi_{qpe,max}}{\pi/2}\right)}, \quad (127)$$

$$D_{y,compensated} \leq k_{subimages,y}(4\rho_x)\sqrt{\left(\frac{|r_{c,0}|}{\lambda_0}\right)\left(\frac{\phi_{pe,max}}{\pi/2}\right)}.$$

Figure 6:
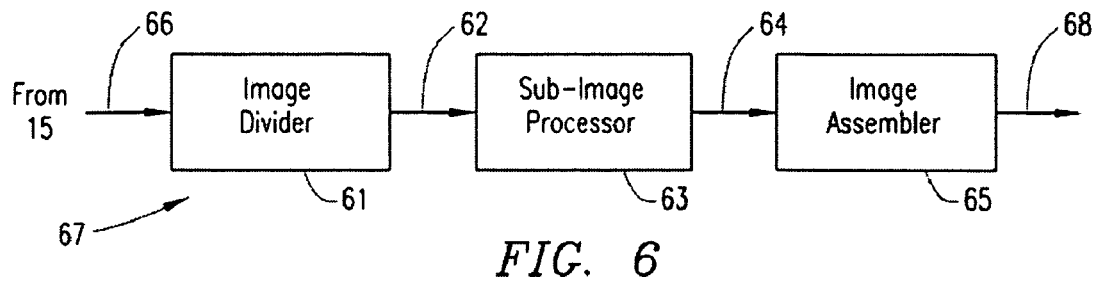
FIG. 6 diagrammatically illustrates an apparatus that can mitigate wavefront curvature effects in a SAR image according to exemplary embodiments of the invention.

FIG. 6 diagrammatically illustrates a mitigation apparatus that can mitigate effects of wavefront curvature on a SAR image according to exemplary embodiments of the invention. An image divider 61 receives a complex SAR image 66. In some embodiments, the complex image is produced by a conventional PFA apparatus, for example, an apparatus as described above with respect to FIGS. 1 and 2. The image divider 61 divides the image into sub-images 62 that respectively correspond to sub-scenes in the target scene represented by the complex image. A sub-image processor 63 receives the sub-images 62 from the image divider 61, mitigates the effect of wavefront curvature on the sub-images, and provides the resulting sub-images at 64. The sub-images at 64 are also referred to herein as wavefront curvature effect-mitigated (or WCE-mitigated) sub-images. An image assembler 65 receives the WCE-mitigated sub-images at 64, and assembles therefrom a corresponding WCE-mitigated image 68 of the target scene.

Figure 7:
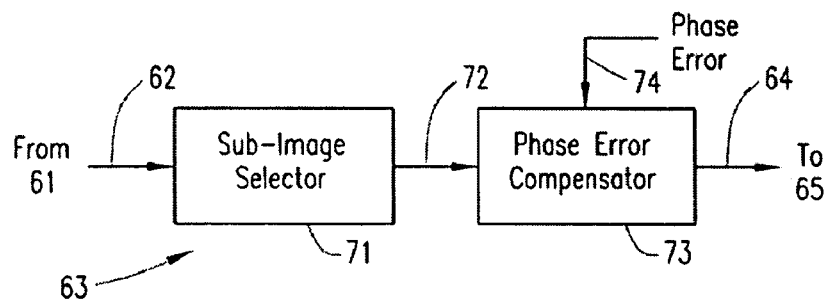
FIG. 7 diagrammatically illustrates a portion of FIG. 6 according to exemplary embodiments of the invention.

FIG. 7 diagrammatically illustrates the sub-image processor 63 of FIG. 6 according to exemplary embodiments of the invention. A sub-image selector 71 selects each of the sub-images 62 for processing. The sub-image selector 71 forwards the selected sub-images at 72 to a phase error compensator 73 that also receives a phase error signal at 74. The phase error compensator 73 uses the phase error signal 74 to compensate for the phase error expected at the center of the selected sub-image, and thereby produces a corresponding WCE-mitigated sub-image 64.

Figure 8:
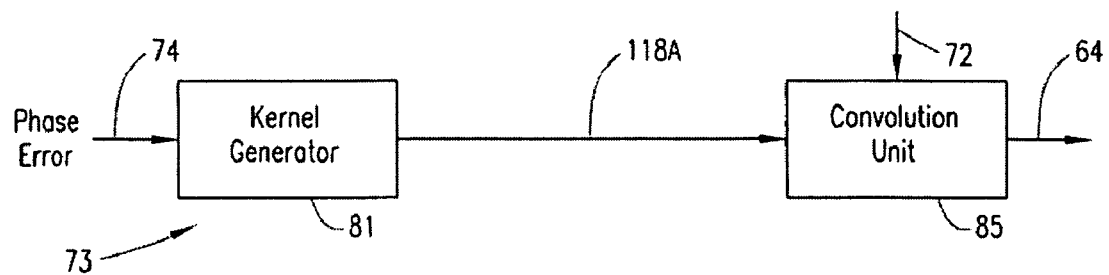
FIG. 8 diagrammatically illustrates a portion of FIG. 7 according to exemplary embodiments of the invention.

FIG. 8 diagrammatically illustrates the phase error compensator 73 of FIG. 7 according to exemplary embodiments of the invention. A kernel generator 81 receives the phase error signal 74, and uses conventional techniques to produce the convolution kernel defined by equation (118A). The convolution kernel is designated as 118A in FIG. 8. A convolution unit 85 receives the convolution kernel 118A and the selected sub-image 72, and uses conventional techniques (e.g., direct convolution or fast convolution) to convolve the selected sub-image 72 with the convolution kernel 118A.

In some embodiments, the complex image 66 of FIG. 6 is produced using conventional PFA processing with a −35 db Taylor window in range and azimuth. In some embodiments, the image divider 61 provides with each sub-image at 62 a suitable set of guard pixels adjacent that sub-image. For example, for all sub-images, the guard pixels can be those pixels adjacently surrounding the sub-image (excepting of course those sub-images that define the edges of the image). The sub-image processor 63 thus receives an "augmented" sub-image that includes the "nominal" sub-image augmented by the adjacent guard pixels. The use of guard pixels can aid in compensating for energy smearing associated with defocusing in the image 66, and energy shifting associated with range and azimuth warping in the image 66. The sub-image processor 63 applies wavefront curvature effect mitigation processing to the "augmented" sub-image just as if it were the "nominal" sub-image. In embodiments that use fast convolution at 85 in FIG. 8, the sub-images produced at 64 are WCE-mitigated versions of the "augmented" sub-images, and the image assembler 65 therefore crops the guard pixels to obtain the desired WCE-mitigated sub-images (having the original "nominal" size). In embodiments that use direct convolution at 85 in FIG. 8, the WCE-mitigated sub-images produced at 64 are of the original "nominal" size, so no cropping is required at the image assembler 65.

Figure 9:
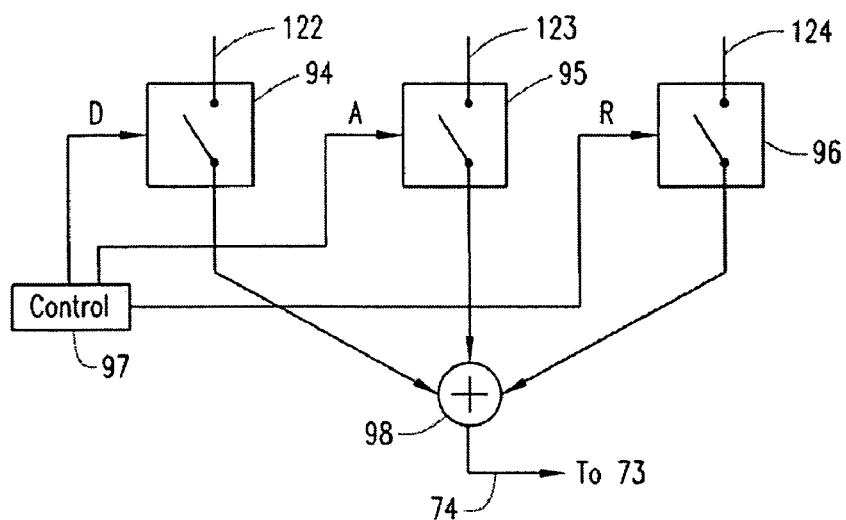
FIG. 9 diagrammatically illustrates an apparatus for providing a phase error signal according to exemplary embodiments of the invention.

FIG. 9 diagrammatically illustrates an apparatus for providing a phase error signal for use in wavefront curvature effect mitigation according to exemplary embodiments of the invention. The apparatus of FIG. 9 can provide, for use by the phase error compensator 73 (see also FIGS. 7 and 8), any one, or any desired combination of, the phase error signals from equations (122), (123), and (124). The phase error signals of equations (122), (123), and (124), designated respectively at 122, 123, and 124 in FIG. 9, are connected to a summing node 98 by respective switches 94, 95, and 96, which are in turn controlled by respective control signals D, A, and R. A controller 97 controls the signals D (defocusing effect), A (azimuth warping effect), and R (range warping effect) depending on which of the wavefront curvature effects, or which combination thereof, is to be mitigated. The summing node 98 provides as its output the phase error signal 74 for the phase error compensator 73. This signal 74 can be any one of the signals 122-124, or a composite sum of any two or all three of the signals 122-124. Although the information and data processing resources used to produce the phase error signals 122-124 (as respectively defined by equations (122)-(124)) are not explicitly shown in FIG. 9, it will be apparent to workers in the art that the required information and resources are readily available on conventional SAR platforms.

Figure 10:
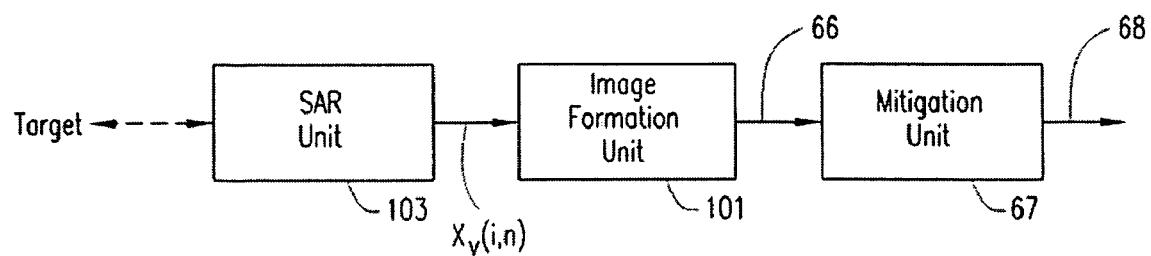
FIG. 10 diagrammatically illustrates a SAR apparatus according to exemplary embodiments of the invention.

FIG. 10 diagrammatically illustrates a SAR apparatus according to exemplary embodiments of the invention. The SAR apparatus of FIG. 10 can be carried on an airborne platform that is capable of executing any one of a plurality of different flight paths (such as described above). A SAR front-end unit 103 uses conventional SAR techniques to obtain the sampled video data $X_r(i,n)$ for a target scene. An image formation unit 101 produces the complex image 66 of the target scene based on the sampled video data $X_r(i,n)$, according to conventional practice (e.g., using an apparatus such as described above with respect to FIGS. 1 and 2). The mitigation unit 67 (see also FIG. 6) can mitigate effects of wavefront curvature associated with the complex image, producing the WCE-mitigated image at 68. The mitigation operation at 67 can be performed differently for different ones of the flight paths, as described above with respect to equations (119)-(124) and FIGS. 6-9.

Although exemplary embodiments of the invention have been described above in detail, this does not limit the scope of the invention, which can be practiced in a variety of embodiments.

What is claimed is:

1. A synthetic aperture radar (SAR) apparatus, comprising:
   an input for receiving a complex image associated with a SAR reflection signal reflected by a target in response to a SAR transmit signal transmitted from an airborne platform that is capable of executing any one of a plurality of different flight paths during transmission of said SAR transmit signal; and
   a mitigation unit coupled to said input for mitigating a SAR wavefront curvature effect associated with said complex image based on which of said flight paths is executed by the airborne platform during transmission of said SAR transmit signal, said mitigation unit operable to perform said mitigating differently for different ones of said flight paths.

2. The apparatus of claim 1, wherein said mitigation unit is configured to apply to said complex image any of a plurality of different mitigation operations that respectively correspond to said plurality of different flight paths, and wherein said mitigation unit is operable for applying to said complex image the one of said mitigation operations that corresponds to the flight path executed by the airborne platform during transmission of said SAR transmit signal.

3. The apparatus of claim 2, wherein said one mitigation operation mitigates a defocusing effect associated with said complex image.

4. The apparatus of claim 3, wherein said one mitigation operation mitigates a geometric distortion effect associated with said complex image.

5. The apparatus of claim 2, wherein said one mitigation operation mitigates a geometric distortion effect associated with said complex image.

6. The apparatus of claim 5, wherein said geometric distortion effect includes a range distortion effect.

7. The apparatus of claim 5, wherein said geometric distortion effect includes an azimuth distortion effect.

8. The apparatus of claim 7, wherein said geometric distortion effect includes a range distortion effect.

9. The apparatus of claim 2, wherein said one mitigation operation includes a deconvolution operation.

10. The apparatus of claim 9, wherein said deconvolution operation deconvolves said complex image with a signal representation of a phase error associated with the SAR reflection signal when the flight platform executes said one flight path during transmission of said SAR transmit signal.

11. The apparatus of claim 2, wherein said mitigation unit includes an image divider for dividing said complex image into a plurality of sub-images, and applies said one mitigation operation separately to each of said sub-images.

12. A synthetic aperture radar (SAR) method, comprising:
   providing a complex image associated with a SAR reflection signal reflected by a target in response to a SAR transmit signal transmitted from an airborne platform that is capable of executing any one of a plurality of different flight paths during transmission of said SAR transmit signal; and
   mitigating a SAR wavefront curvature effect associated with said complex image based on which of said flight paths is executed by the airborne platform during transmission of said SAR transmit signal, including performing said mitigating differently for different ones of said flight paths.

13. The method of claim 12, wherein said mitigating further includes providing a plurality of different mitigation operations that respectively correspond to said plurality of different flight paths, and applying to said complex image the one of said mitigation operations that corresponds to the flight path executed by the airborne platform during transmission of said SAR transmit signal.

14. The method of claim 13, wherein said one mitigation operation mitigates a defocusing effect associated with said complex image.

15. The method of claim 14, wherein said one mitigation operation mitigates a geometric distortion effect associated with said complex image.

16. The method of claim 13, wherein said one mitigation operation mitigates a geometric distortion effect associated with said complex image.

17. The method of claim 13, wherein said one mitigation operation includes a deconvolution operation.

18. The method of claim 17, wherein said deconvolution operation deconvolves said complex image with a signal representation of a phase error associated with the SAR reflection signal when the flight platform executes said one flight path during transmission of said SAR transmit signal.

19. The method of claim 13, wherein said mitigating further includes dividing said complex image into a plurality of sub-images, and applying said one mitigation operation separately to each of said sub-images.

20. A SAR apparatus, comprising:

a SAR unit for transmitting a SAR transmit signal while carried aboard an airborne platform that is capable of executing any one of a plurality of different flight paths during transmission of said SAR transmit signal, said SAR unit having an input for receiving a SAR reflection signal reflected by a target in response to said SAR transmit signal;

an image formation unit coupled to said SAR unit for producing a complex image based on said SAR reflection signal; and a mitigation unit coupled to said image formation unit for mitigating a SAR wavefront curvature effect associated with said complex image based on which of said flight paths is executed by the airborne platform during transmission of said SAR transmit signal, said mitigation unit operable to perform said mitigating differently for different ones of said flight paths.

21. The apparatus of claim 20, wherein said mitigation unit is configured to apply to said complex image any of a plurality of different mitigation operations that respectively correspond to said plurality of different flight paths, and wherein said mitigation unit is operable for applying to said complex image the one of said mitigation operations that corresponds to the flight path executed by the airborne platform during transmission of said SAR transmit signal.

22. The apparatus of claim 21, wherein said one mitigation operation mitigates a defocusing effect associated with said complex image.

23. The apparatus of claim 22, wherein said one mitigation operation mitigates a geometric distortion effect associated with said complex image.

24. The apparatus of claim 21, wherein said one mitigation operation mitigates a geometric distortion effect associated with said complex image.

* * * * *